United States Patent [19]

Miller et al.

[11] Patent Number: 4,865,702
[45] Date of Patent: Sep. 12, 1989

[54] PROCESS OF ELECTROCHEMICALLY RE-ALKALIZING REINFORCED CONCRETE

[75] Inventors: John B. Miller, Oslo; Oystein Vennesland, Trondheim, both of Norway

[73] Assignee: Norsk Averflate Teknikk A/S (NOT), Oslo, Norway

[21] Appl. No.: 143,971

[22] Filed: Jan. 11, 1988

[51] Int. Cl.[4] .............................................. C23F 13/00
[52] U.S. Cl. ..................................... 204/147; 204/130; 264/27; 264/36; 264/340; 425/174.6
[58] Field of Search ................... 264/27, 36, 228, 229, 264/340, DIG. 45, DIG. 46; 425/174.6; 204/147, 196; 52/169.14, 514, 515, 741

[56] References Cited

U.S. PATENT DOCUMENTS

| | | | |
|---|---|---|---|
| 3,475,304 | 10/1969 | Currey | 204/147 |
| 4,255,241 | 3/1981 | Kroon et al. | 204/147 |
| 4,506,485 | 3/1981 | Apostolos | 52/515 |
| 4,692,066 | 9/1987 | Clear | 204/147 X |
| 4,699,703 | 10/1987 | Norman | 204/196 |

FOREIGN PATENT DOCUMENTS

| | | | |
|---|---|---|---|
| 85582 | 8/1983 | European Pat. Off. | 204/147 |
| 186334 | 7/1986 | European Pat. Off. | 204/147 |
| 1111602 | 7/1961 | Fed. Rep. of Germany | 204/147 |
| 61-221434 | 10/1986 | Japan | 204/147 |
| 62-199784 | 9/1987 | Japan | 204/147 |
| 62-199785 | 9/1987 | Japan | 204/196 |
| WO86/06759 | 11/1986 | PCT Int'l Appl. | 204/196 |
| 2140456 | 11/1984 | United Kingdom | 204/147 |

OTHER PUBLICATIONS

"Steel-in-Concrete Corrosion and Cathodic Protection", Matcor, Inc., Doylestown, Pa. (1985).

*Primary Examiner*—Jeffery Thurlow
*Assistant Examiner*—Leo B. Tentoni
*Attorney, Agent, or Firm*—Schweitzer & Cornman

[57] ABSTRACT

A process is disclosed for re-alkalizing carbonized reinforced concrete. An electric current is impressed between adjacent areas of concrete, one of which has become carbonized with consequent loss of pH, and the other of which is adequately alkaline in pH. The impressed voltage causes a migration of hydroxyl ions from the higher pH region to the lower pH region, to effect an increase in pH of the carbonized region to a satisfactory level. The region of high pH concrete may be either non-carbonized areas of the original concrete or a temporarily applied layer of an alkaline electrolyte.

8 Claims, 1 Drawing Sheet

PROCESS OF ELECTROCHEMICALLY RE-ALKALIZING REINFORCED CONCRETE

BACKGROUND AND SUMMARY OF THE INVENTION

The present invention concerns a method of re-alkalizing carbonated zones in concrete, and the like, in order to rehabilitate the condition of such concrete.

Reinforcement and other steel objects which are cast in concrete, cements or calcareous materials, such as mortar, plaster or gunite etc., are normally protected against corrosion because of the alkaline environment in the mass. Gradually however, the alkaline concentration is reduced by the absorption of carbon dioxide and sulphur trioxide. This absorption leads to a gradual neutralization of the alkaline environment. When the pH-value of the mass reaches 9.5 (approx.) the steel is no longer protected and corrosion is initiated.

The most well-known neutralization reaction is caused by the absorption of carbon dioxide, and is known as "carbonation".

Carbonation is already a serious problem today as is evidenced by the structural damage to buildings caused by the corrosion of reinforced steel, which in turn reduces the cross-section of the steel, and leads to the penetration of the concrete overlay as well as reductions in strength.

Damage caused by carbonation easily becomes a serious matter and is both difficult and expensive to repair. Traditionally this type of damage is repaired by chopping away the carbonated zone, sandblasting the exposed steel, and then concreting or using gunite. Sealing, combined with elutriation or a filler, is another approach. The result is seldom satisfactory as far as durability and load-carrying capability are concerned.

The purpose of the present invention is to find a means of repairing carbonated zones in concrete etc. which produce better results than the methods already in existence.

One of the characteristics of carbonation is that the damage is usually restricted to the surface zones of the structure, i.e., in the zone down to the first layer of reinforcement. This is normally a thin zone in relation to the remainder of the concrete cross-section, which is non-carbonated and has a surplus of alkaline matter.

The present invention concerns a method for the realkalization of carbonated zones in concrete by electrochemical migration of hydroxyl ions.

The carbonated zone is supplied with alkaline ions either from the fresh interior of the concrete etc., or from an external electrolytic medium by employing electricity. The re-alkalization from this alkaline matter re-establishes the corrosive protection of the steel.

The procedure is based on the following principle:

When a base electrolytic solution which contains calcium, sodium and potassium hydroxide, for example, is exposed to an electrical field between two electrodes, ions will be transported between the electrodes, which will make the area in the immediate vicinity of one of the electrodes highly alkaline. This alkaline content remains after the removal of the electrical field.

This procedure is executed in practice in the following way:

1. If the concrete etc., contains a double layer of reinforcement, where one layer is in carbonated concrete and the other is in fresh concrete, the reinforcement in the carbonated zone is connected to one pole on a rectifier or battery. While the structure is maintained under the electrical field, as described, the alkaline hydroxyl-ions migrate to the reinforcement pH conditions can be monitored by existing methods, such as pH-sensitive tracers or pH-electrodes. When the desired pH value is reached (usually over 12), the current can be disconnected.

2. If the concrete contains one layer of reinforcement, or possibly a second layer which is inaccessible, or if the distance between the two layers is too great for the technique described in point 1 to be feasible, an external electrode is located in a suitable electrolytic medium on the surface of the structure. This electrode can consist of wires, cords, plates, foil or sheet metal, conducting plastics or other conductive materials. The electrolyte can be an aqueous solution of calcium, sodium and/or calcium salts either in a liquid or absorbed in a porous medium such as rock wool, cellulose, sawdust, sand, clay and the like, or it can be strongly retarded concrete, mortar, cement grout, lime paste etc. When a cement-based concrete, mortar or paste is used, a strongly retarding substance such as sucrose is added to prevent the mass from setting, thus once the treatment is completed, this mass can be removed by scraping or flushing.

The external electrode is connected to one pole of the rectifier or battery, and the reinforcement in the carbonated zone is connected to the other pole in the manner described in point 1, above.

The speed of the re-alkalization process depends on the direct voltage which is applied, which is in turn dependent on the conductivity of the concrete and electrolyte, the density of the electrodes, and the distance between them. For normal building structures this voltage should be between 6–20 V, which will ensure that the re-alkalization is completed within a matter of days or weeks, depending on the overall conditions and the degree and depth of carbonation.

DESCRIPTION OF THE DRAWINGS

The method is illustrated in the enclosed drawings, where.

DESCRIPTION OF PREFERRED EMBODIMENTS

Figure 1:
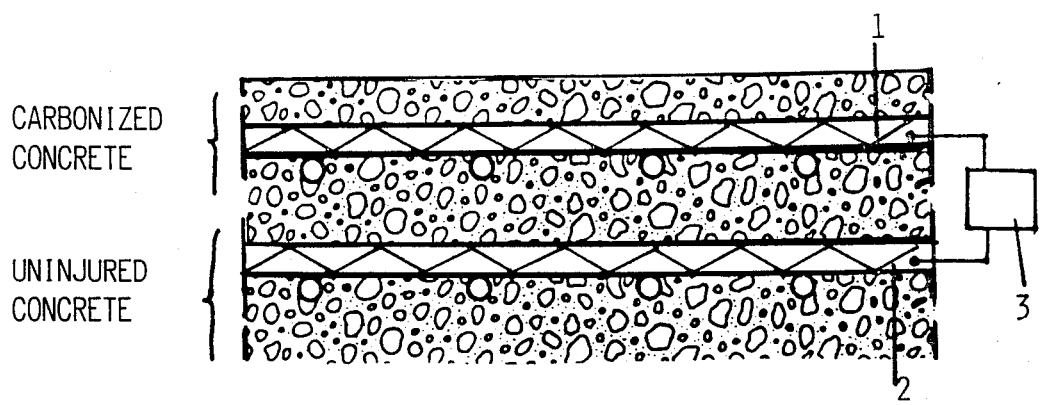
FIG. 1 shows a section through part of a concrete structure, where electricity is applied to the reinforcement in fresh and carbonated concrete, respectively.

The procedure will be described in more detail with reference the enclosed illustrations. In FIG. 1, there is a layer of reinforcement 1 in an area with carbonated concrete and a layer of reinforcement 2 is in fresh concrete. The reinforcement 1 is connected to one pole of a rectifier or battery 3, and the reinforcement 2 connected to the other pole. When the current is supplied the alkaline hydroxyl-ions migrate to the reinforcement 1 in the carbonated zone.

Figure 2:
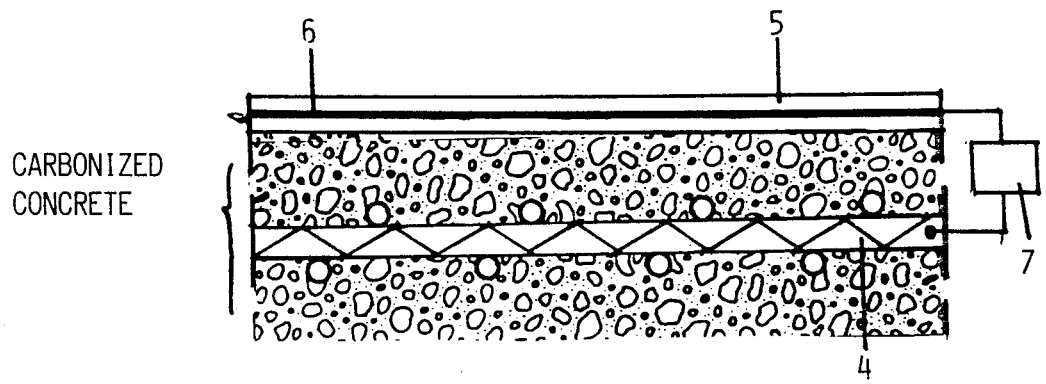
FIG. 2 shows an equivalent section through a concrete structure where electricity is supplied by means of an external electrode in an electrolytic medium and part of the reinforcement in carbonated concrete.

In FIG. 2, the reinforcement 4 is in a carbonated zone in the concrete. A suitable electrolytic medium 5 is applied to the surface of the structure. An electrode 6 has been located in this medium 5. The electrode 6 is connected to one pole of the battery or rectifier 7, while the reinforcement 4 in the carbonated zone is connected to the other pole. When the current is supplied, the alkaline hydroxyl-ions will migrate from an external medium 5 to the reinforcement 4 in the carbonated zone.

As a rule the polarity is selected so that the reinforcement in the carbonated concrete is connected to the negative pole of the battery. In special cases it could be an advantage to reverse the polarity (this is dependent on factors such as the type of salt in the electrolytic medium).

We claim:

1. The method of re-alkalizing a relatively carbonated zone of a concrete structure from an adjacent zone of relatively alkaline medium, wherein the carbonated zone has a pH substantially below 12, which comprises,
    (a) applying between said zones a direct current voltage of at least about six volts to effect a migration of alkaline ions from said relatively alkaline medium to said relatively carbonated zone,
    (b) generally maintaining said voltage until said relatively carbonated zone reaches a pH of about 12, and
    (c) thereafter discontinuing the application of said voltage.

2. The method of claim 1, further characterized by
    (a) said alkaline medium comprising relatively non-carbonated zones of said concrete structure integral with and adjacent to said relatively carbonated zones.

3. The method of claim 1, further characterized by
    (a) said zone of relatively alkaline medium comprising a mass of electrolytic medium applied to said structure,
    (b) said medium being removed from said structure upon discontinuance of said applied voltage.

4. The method of claim 3, further characterized by
    (a) said electrolytic medium comprising a material selected from the group consisting of concrete, mortar, cement grout and lime paste, said material being strongly retarded to prevent setting.

5. The method of claim 3, further characterized by
    (a) said medium being adherently applied to said structure during the application of said voltage and being removed from the structure after discontinuance of said voltage.

6. The method of claim 1, further characterized by
    (a) said direct current voltage being generally between 6 and 20 volts.

7. The method of claim 3, further characterized by
    (a) said electrolytic medium comprising a material selected from the group consisting of calcium, calcium salts, sodium and sodium salts, said electrolytic medium being an aqueous solution in liquid form.

8. The method of claim 3, further characterized by
    (a) said electrolytic medium comprising a material selected from the group consisting of calcium, calcium salts, sodium and sodium salts, said electrolytic medium being an aqueous solution absorbed in a porous medium.

* * * * *